US007499921B2

(12) United States Patent
Raghavachari

(10) Patent No.: US 7,499,921 B2
(45) Date of Patent: Mar. 3, 2009

(54) STREAMING MECHANISM FOR EFFICIENT SEARCHING OF A TREE RELATIVE TO A LOCATION IN THE TREE

(75) Inventor: Mukund Raghavachari, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 10/752,624

(22) Filed: Jan. 7, 2004

(65) Prior Publication Data

US 2005/0149503 A1   Jul. 7, 2005

(51) Int. Cl.
  *G06F 17/30* (2006.01)
(52) U.S. Cl. ............... 707/5; 707/4; 707/101; 707/1; 707/3
(58) Field of Classification Search ........ 707/3, 707/4, 5
  See application file for complete search history.

(56) References Cited

U.S. PATENT DOCUMENTS

| 6,442,545 | B1 * | 8/2002 | Feldman et al. ............ 707/6 |
| 7,171,407 | B2 * | 1/2007 | Barton et al. ............... 707/4 |
| 2002/0165872 | A1 * | 11/2002 | Meltzer et al. ............. 707/500 |
| 2003/0074352 | A1 * | 4/2003 | Raboczi et al. ............. 707/4 |
| 2004/0010754 | A1 * | 1/2004 | Jones ....................... 715/513 |
| 2004/0060007 | A1 * | 3/2004 | Gottlob et al. ............. 715/513 |
| 2004/0073541 | A1 * | 4/2004 | Lindblad et al. ........... 707/3 |
| 2004/0076541 | A1 * | 4/2004 | Lindblad et al. ........... 707/3 |
| 2004/0167864 | A1 * | 8/2004 | Wang et al. ............... 707/1 |
| 2005/0097084 | A1 * | 5/2005 | Balmin et al. ............. 707/3 |
| 2005/0138064 | A1 * | 6/2005 | Trappen et al. ........ 707/103 R |
| 2007/0156750 | A1 * | 7/2007 | Calahan .................... 707/102 |

OTHER PUBLICATIONS

Georg Gottlob, Christoph Koch, Reinard Pichler, Efficient Algorithms for Processing XPath Queries (article), Aug. 2002, Hong Kong, China.

* cited by examiner

*Primary Examiner*—Don Wong
*Assistant Examiner*—Angela M Lie
(74) *Attorney, Agent, or Firm*—Michael J. Buchenhorner; Vazken Alexanian

(57) ABSTRACT

A system and method for processing documents, comprises steps of: receiving a query comprising search criteria and wherein the criteria comprise a set of constraints that specify forward or backward relations between nodes; receiving a location in the tree with respect to which the query must be evaluated; receiving at least a portion of a document; modifying the search criteria such that constraints specifying a backward relation may be reformulated into constraints specifying a forward relation and introducing a context node at a location along a forward edge origination at the root of the tree structure; processing the document using the modified criteria; and locating one or more nodes that satisfy the search criteria.

12 Claims, 8 Drawing Sheets

//b[ancestor::a//d]

STREAMING MECHANISM FOR EFFICIENT SEARCHING OF A TREE RELATIVE TO A LOCATION IN THE TREE

CROSS-REFERENCE TO RELATED APPLICATIONS

This application relates to technology related to that discussed in U.S. patent application Ser. No. 10/264,076 entitled "A METHOD FOR STREAMING XPATH PROCESSING WITH FORWARD AND BACKWARD AXES" which is hereby incorporated by reference.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information handling systems, and more particularly relates to the field of searching data structures.

BACKGROUND OF THE INVENTION

XPath is a language for addressing XML (extensible Markup Language) documents. XPath has been widely accepted in many environments, especially in database environments. In fact, query languages such as XSLT, SQLX, and XQuery include XPath as a sublanguage. Given the importance of XPath as a mechanism for querying and navigating data, it is important that the evaluation of XPath expressions on XML documents be as efficient as possible. Ideally, the evaluation algorithm will traverse the XML document as little as possible before returning the result of the query.

The evaluation of an XPath expression is defined in terms of a tree structure representation of an XML document. A tree is a data structure composed of nodes. One of the nodes is specially designated to be the root node. All nodes in the tree other than the root node have exactly one parent node in the tree. An XML document can be represented as a labeled tree whose nodes represent the structural components of the document—elements, text, attributes, comments, and processing instructions. Element and attribute nodes have labels derived from the corresponding tags in the document and there may be more than one node in the document with the same label. Parent-child edges in the tree represent the inclusion of the child component in its parent element, where the scope of an element is bounded by its start and end tags. The tree corresponding to an XML document is rooted at a virtual element, Root, which contains the document element. We will, henceforth, discuss XML documents in terms of their tree representation. One can define an arbitrary order on the nodes of a tree. One such order might be based on a left-to-right depth-first traversal of the tree, which, for a tree representation of an XML document, corresponds to the document order.

Given an order on a tree, we can define a notion of a forward and backward relation on a tree. A relation R is a forward relation if whenever two nodes x and y are related by R, it must be the case that x precedes y in the order on the tree. Similarly, a relation is a backward relation if whenever x is related to y, then it must be the case that x follows y in the order on the tree. For example, assuming the document order for a tree representation of an XML document, the child and descendant relations are both forward relations, whereas the parent and ancestor relations are both backward relations.

An XPath expression over the tree representation of an XML document is evaluated in terms of a context node. The context node is a node in the tree representation of the document. If the context node is the root node of the document, the XPath expression is said to be an absolute XPath expression, otherwise, it is known as a relative XPath expression. Starting at a context node, an XPath expression specifies the axis to search and conditions that the results should satisfy. For example, assume that the context node is an element node c in the tree representation of an XML document. The XPath expression descendant::x specifies that starting from c, search all descendants of c and return all element nodes with label x. In this expression, "descendant" is the axis that is searched. One can compose XPath expressions to form larger XPath expressions. For example, the XPath expression descendant::x/ancestor::y specifies that starting from the context node c, find all element nodes that are descendants of c with label x, and for each such node, find all ancestor nodes with label y.

In traditional XPath processing, the XML document, over which XPath expressions are to be evaluated, is processed and a tree representation is built in memory. In evaluating an XPath expression over this in-memory tree representation of an XML document, an XPath processor, such as Xalan, may make several passes over the XML document. In the worst case, the number of passes over the XML document may be exponential in the size of the XPath expression (Georg Gottlob, Christoph Koch, Reinhard Pichler: Efficient Algorithms for Processing XPath Queries. VLDB 2002: 95-106). In many circumstances, for example, for large XML documents stored on a disk in a database, these multiple traversals can be prohibitively expensive. Xalan is an XSLT processor for transforming XML documents into HTML, text, or other XML document types. It implements XSL Transformations (XSLT) Version 1.0 and XML Path Language (XPath) Version 1.0. It can be used from the command line, in an applet or a servlet, or as a module in other program.

To alleviate this problem, streaming XPath evaluation algorithms have been developed that return a query result after exactly one pass over an XML document or tree. A streaming XPath engine is structured as shown in FIG. 1. An XPath expression 111 is analyzed and represented as an automaton 103. The XPath engine 101 consumes events (for example, SAX events) produced by a parser 105, and for each event, the automaton 103 may make state transitions, and if necessary, store the element. At the end of processing the document 107 the XPath engine returns the list of elements 109 that are the result of the evaluation of the XPath expression 111.

Algorithms for processing streaming XPath expressions are generally limited to absolute XPath expressions containing only forward axes (child and descendant axes). Discussing a related technology, U.S. patent application Ser. No. 10/264,076 entitled "A Method for Streaming XPath Processing with Forward and Backward Axes" by Charles Barton, Philippe Charles, Deepak Goyal, and Mukund Raghavachari, Proceedings of IEEE International Conference on Data Engineering, March 2003, presents a novel modification allowing streaming algorithms to handled both forward and backward axes (parent and ancestor) efficiently. More information is detailed in "Streaming XPath Processing with Forward and Backward Axes" by Charles Barton, Philippe Charles, Deepak Goyal, Mukund Raghavachari, Marcus Fontoura, and Vanja Josifovski, cited above. A novel representation of a data structure called an X-DAG makes this possible. An X-DAG is a data structure in which all occurrences of backward axes are converted into forward constraints, thereby making streaming XPath processing possible.

A limitation of this streaming algorithm is that it, like other streaming algorithms, only handles absolute XPath expressions. In practice, however, relative XPath expressions are more prevalent. To improve the efficiency of XPath processing it is important to devise streaming techniques for evaluating relative XPath expressions with both forward and backward axes in at the most one traversal of an XML document or tree.

Current streaming algorithms always traverse the entire XML document (exactly once) to evaluate an XPath expression over an XML document. In many cases, however, by ordering the XML document appropriately, it is possible to minimize the amount of the document traversed. When a relative expression is evaluated with respect to the context node c, it is more likely that the nodes around c will be relevant to the result than nodes in the tree that are far away from c. By reordering the traversal of the tree so that such nodes are traversed first, one can minimize the number of nodes traversed in many cases. For example, for the XPath expression descendant::x evaluated with respect to the context node c, we would only like to traverse the descendants of c and avoid traversal of the rest of the XML document. In general, such reorderings must handle complex XPath expressions involving ancestor and descendant axes, and integrate any such reordering into the streaming algorithm in a clean manner so that the algorithm still functions correctly.

SUMMARY OF THE INVENTION

According to the invention, a method for processing an electronic document, wherein the document comprises a tree structure comprising branches comprising a plurality of nodes, comprises steps of: receiving a query comprising search criteria and wherein the search criteria comprise a set of constraints that specify forward or backward relations between nodes; receiving a context node in the document with respect to which the search criteria are applied; receiving at least a portion of a document; modifying the search criteria to introduce a constraint matching the context node into the set of constraints; processing the document in a streaming manner using the modified search criteria; and locating one or more nodes that satisfy the modified search criteria. A document is processed in a streaming manner if the document is traversed in a depth-first, left-to-right manner, visiting each node only exactly once (as if the document were processed by a streaming parser such as SAX). The invention is effective in either the case where the document to be searched is streaming or where it is stored in memory.

According to another aspect of the invention, a mechanism for reordering the tree on which an XPath expression is evaluated so that relevant nodes are accessed as early as possible.

BRIEF DESCRIPTION OF THE DRAWINGS

FIG. 3 shows an example of an XPath expression.

DETAILED DESCRIPTION

We discuss an algorithm which allows for the efficient evaluation of relative XPath expressions with either or both forward and backward axes. Efficiency is guaranteed by allowing at most one traversal of the XML document. Additionally, an optimization to this invention will be presented which will further increase the speed and efficiency by minimizing the number of nodes visited.

Figure 1:
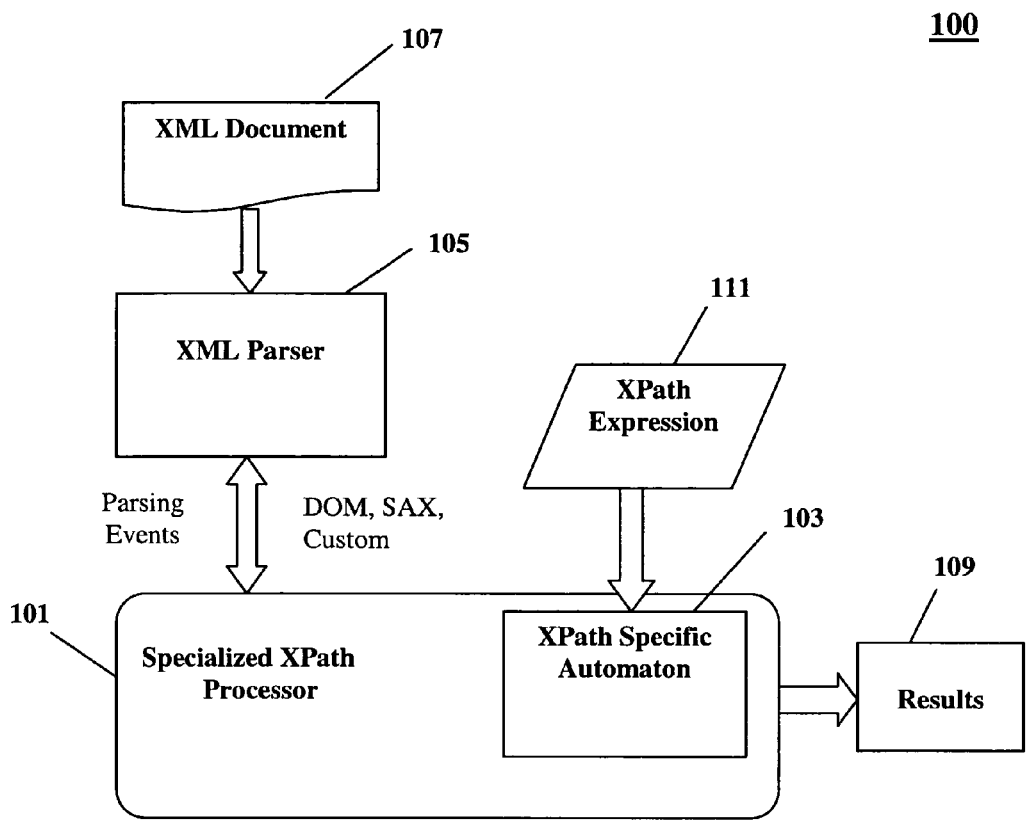
FIG. 1 is a block diagram of the structure of a streaming XPath processor, according to the prior art.
Figure 2:
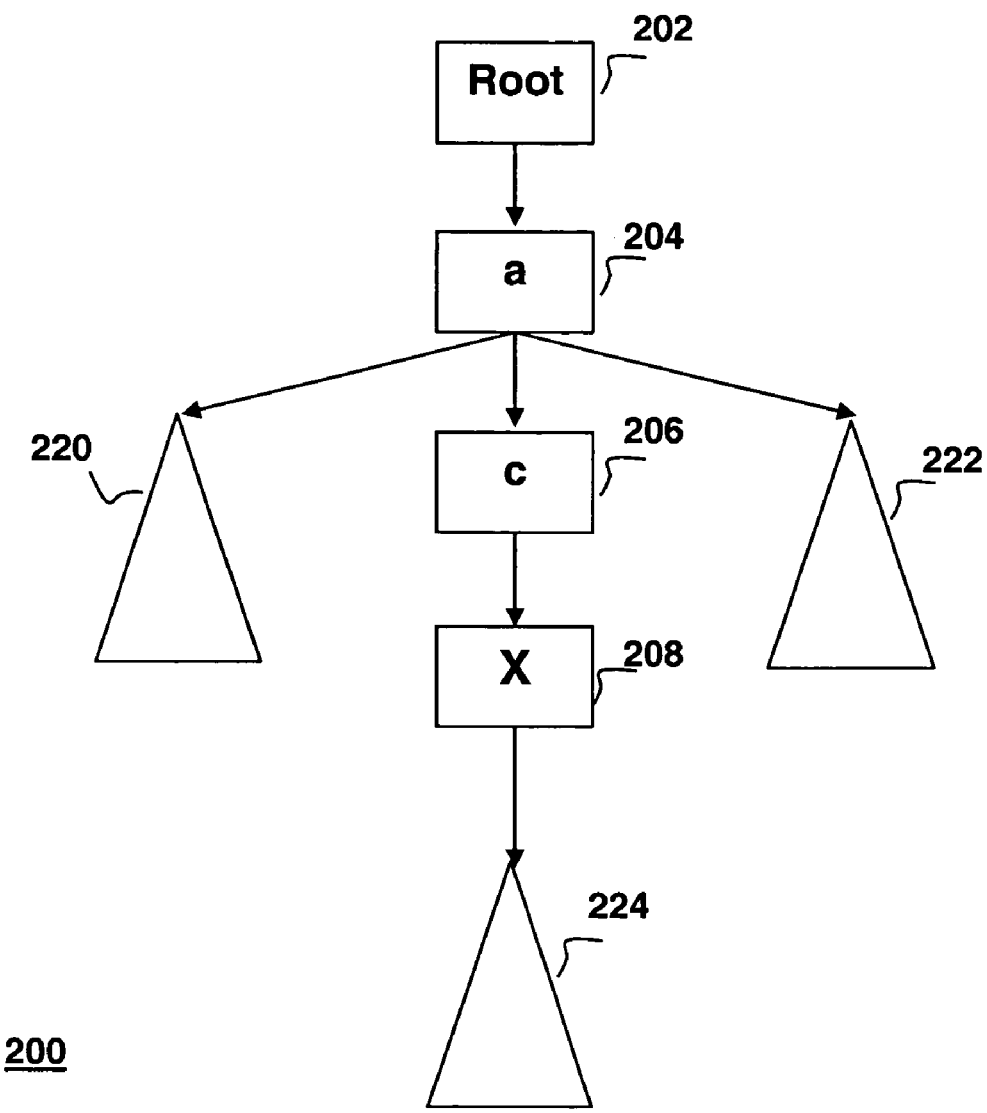
FIG. 2 is a simplified representation of an XML document in tree form.

FIG. 2 illustrates a tree structure representation of a portion of an XML document. For simplicity, we focus on elements and ignore such items as attributes and text nodes. The tree 200 therefore, consists of the virtual Root 202 and the elements of the document. To avoid confusion between the XML document tree 200 and a tree representation of the XPath we use elements to refer to the nodes of the XML tree 200. The Root 202 has a descendant 204 labeled "a." "a" has two subtrees 220 and 222 and a descendant 206 labeled "c" which in turn has a descendant 208 which is an element "X." The element 208 has a subtree 224. Note that in general the subtrees contain one or more elements, which are not shown. We shall assume that the element 208, labeled "X", is the context node to be used for XPath expressions.

Figure 3:
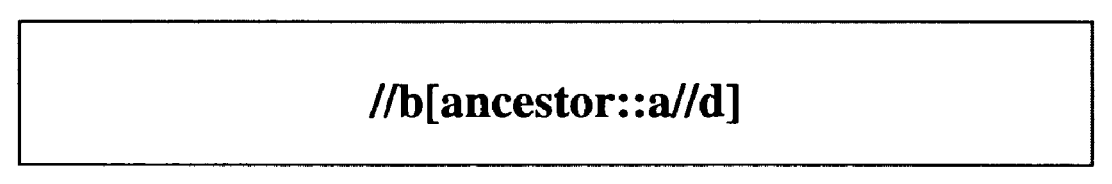

Referring now to FIG. 3 there is shown an XPath expression of the form //b[ancestor::a//d]. Given the tree 200, if one evaluates the XPath expression with the element 208 as the context node, one would obtain all "b" descendants of "X" such that the "b" element has an ancestor "a" which has a descendant "d." Note that since the "b" element in the result has to be a descendant of "X," all these "b" nodes will be found in subtree 224.

Current algorithms would evaluate this XPath expression by finding each "b" descendant of "X" and for each of these "b" elements, traverse up the tree until an "a" element is reached, and then, search all subtrees rooted at the "a" elements for "d" descendants. Note that elements in the subtrees rooted at "a" (subtrees 220, 224, and 222 and elements 206 and 208) will be visited several times, once for each "b" descendant of "X." Our algorithm will perform a single depth-first traversal of the input document 107 to determine all "b" elements that are descendants of the context node "X" such that all the abovementioned conditions specified by the XPath are satisfied.

In our algorithm, the input XPath expression is converted into a set of constraints of the form S1→S2 where S1 and S2 are sets of labels. For example, the XPath expression can be expressed as the following set of constraints:

1 {Root}→{a}

2 {a}→{b,d}

3 {b}→{ }

Figure 4:
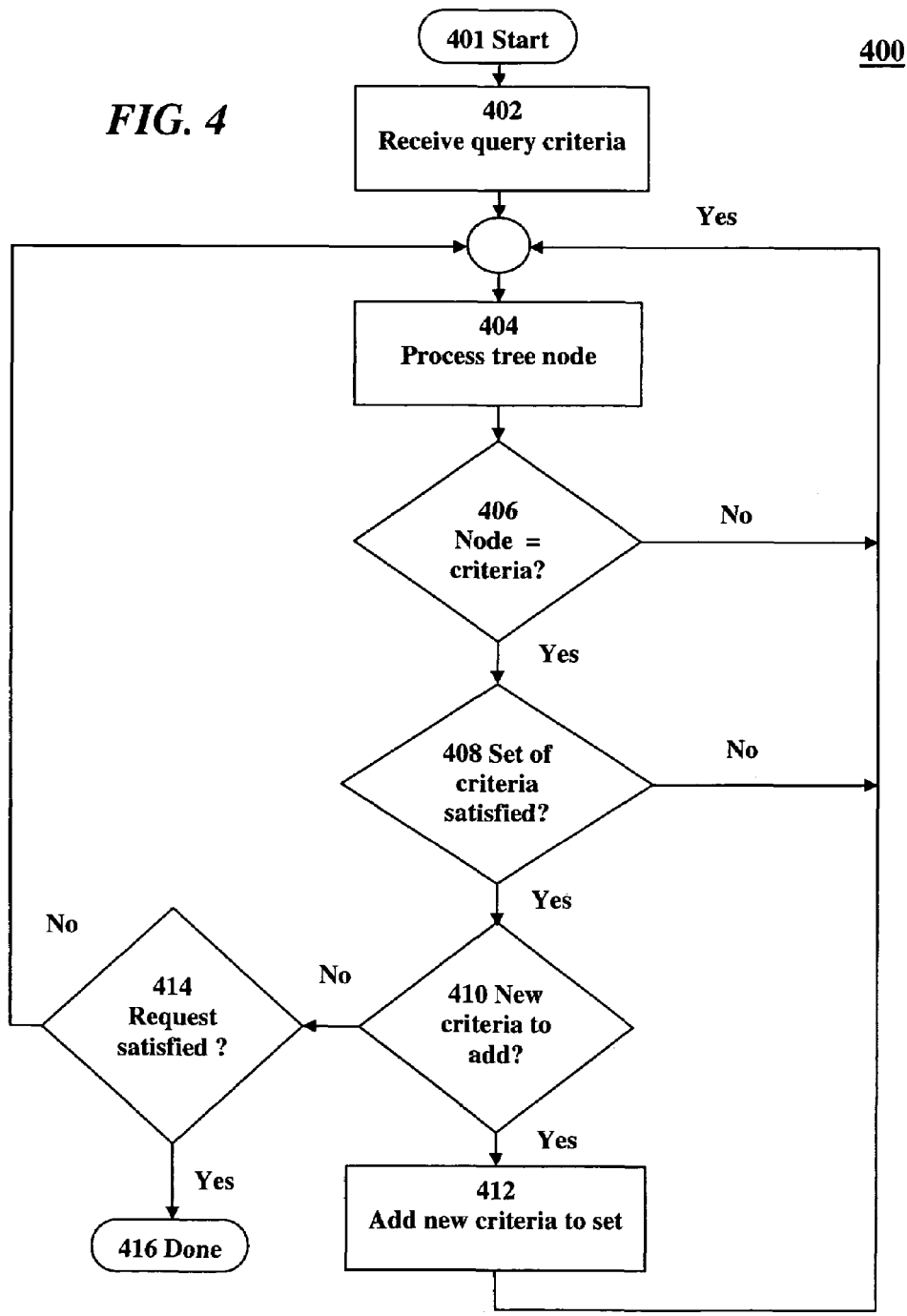
FIG. 4 shows a high-level flowchart showing the processing of the tree of FIG. 2.

Referring to FIG. 4 there is shown a flowchart showing how an algorithm according to an embodiment of the invention processes the tree of FIG. 2 and a set of constraints to compute the set of nodes that satisfy the above constraints. The flowchart implicitly assumes that the tree is traversed using the following steps starting at Root (as would be done by a streaming, event-based parser):

1. Issue a "start" element event;
2. Recursively visit the children in left to right order; and
3. Issue a "close" element event.

We start with a set of active criteria 402. In this example, the only active criterion when we start is {Root}. For each element processed in 404, we check to see if the element matches any of the active criteria in step 406. If it does, then the algorithm checks to see whether the set of criteria corresponding to the left-hand side of any constraint is fully satisfied in step 408. If it is, then in step 410 we check to see whether the set of criteria in the right-hand side of the constraint is empty or not. If it is not empty, we add this set of criteria to the set of active criteria in step 412. If the set is empty, we check to see if all constraints have been satisfied in step 414. If so, then we have found a solution. Otherwise, we proceed to process the next element.

Figure 5:
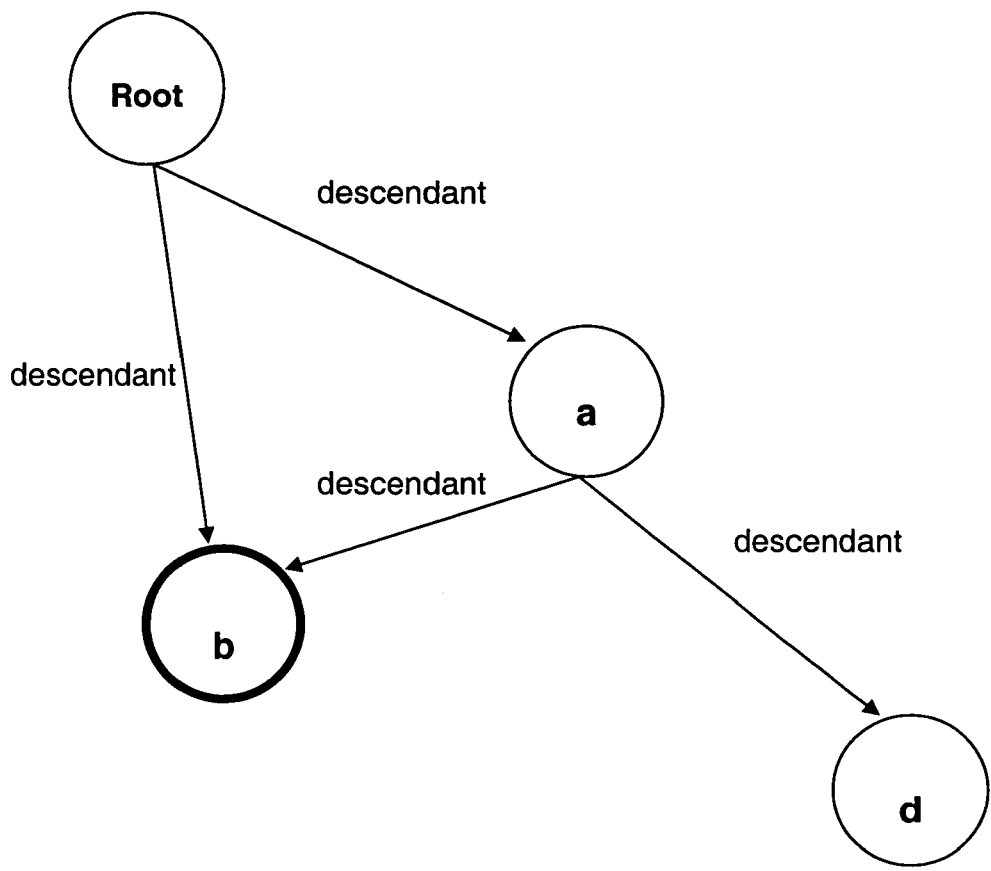
FIG. 5 shows a directed acyclic graph representation of the XPath expression of FIG. 3.

Referring to FIG. 5 there is shown a directed acyclic graph (DAG) representation of the XPath expression //b[ancestor::a//d]. Given an absolute XPath expression of the form "//b[ancestor::a//d]," the streaming XPath processor would create an X-DAG of the form shown in FIG. 5. The algorithm would operate over this data structure in generating the query result, guaranteeing exactly one traversal of the input document 107. An X-DAG is a graph representation of an internal data structure created from an XPath expression. It represents the XPath expression and all of its constraints.

The X-DAG is a key construct in this method since it converts backward constraints, such as "ancestor", into forward constraints, thus making streaming processing possible for expressions that contain backward axes. Converting backward constraints into forward constraints is accomplished by modifying the constraints without modifying the meaning of the query. To illustrate, consider the example of finding all nodes "John" with an ancestor node named "Fred." With the X-DAG representation, we would modify the constraint to look for all "Fred" nodes, and then find all descendant nodes named "John" of these "Fred" nodes rather than the original constraint of "find a 'John' node with an ancestor 'Fred.'" The X-DAG 500 is obtained by reformulating the ancestor and parent constraints in the tree as descendant and child constraints. The construction of the X-DAG and the streaming algorithm for processing absolute XPath expressions is described in detail in U.S. patent application Ser. No. 10/264,076 entitled "A METHOD FOR STREAMING XPATH PROCESSING WITH FORWARD AND BACKWARD AXES" which is incorporated herein by reference.

Figure 6:
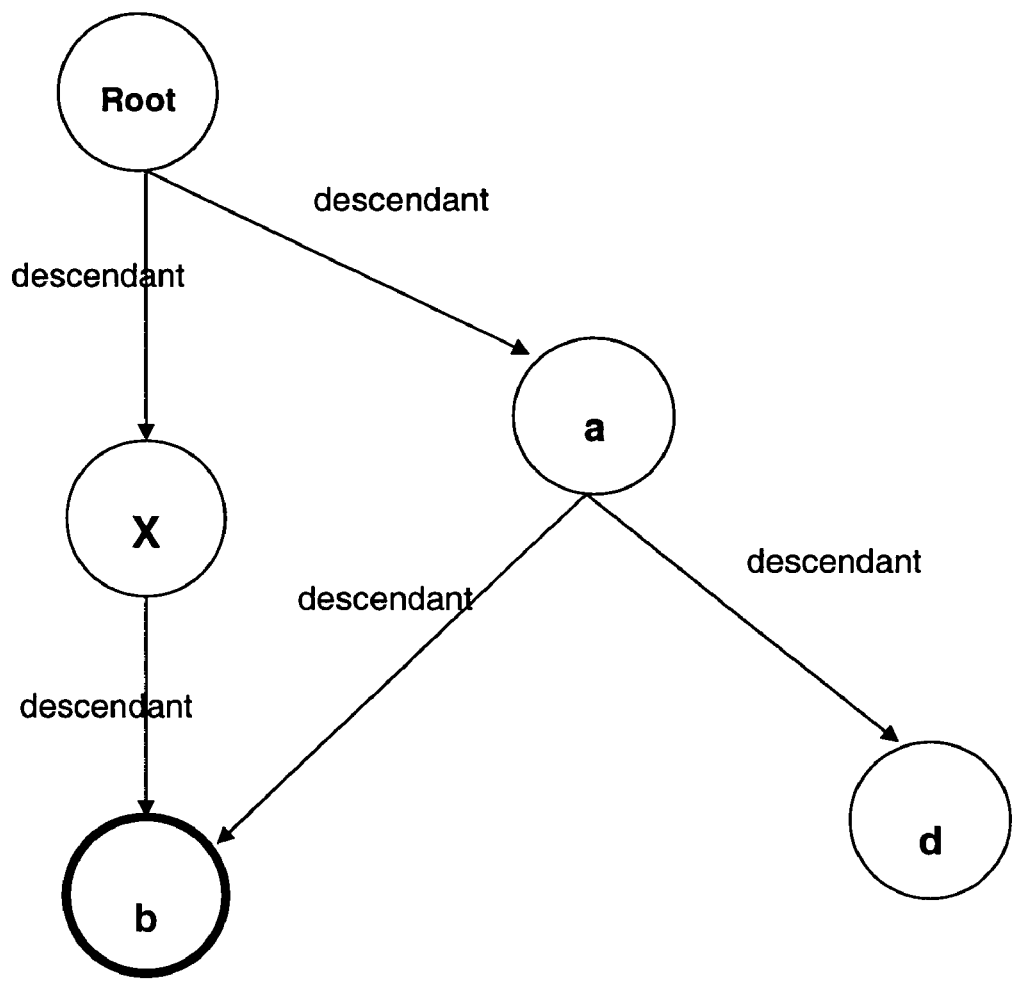
FIG. 6 is a modified directed acyclic graph representation of FIG. 5, according to an embodiment of the invention.

The abovementioned algorithm and X-DAG, however, do not handle relative XPath expressions. Referring to FIG. 6 there is shown a modified X-DAG, created in order to evaluate the XPath expression "//b[ancestor::a//d]" relative to a context node. This modified X-DAG contains a special "Ctxt" node, which will only match the context node. More specifically, given an element "X," with respect to which one wishes to evaluate a relative XPath, an X-DAG will be constructed such that it contains a "Ctxt" node and the "Ctxt" node in the X-DAG will only match the element "X" during processing. The set of criteria is then modified to include constraints with respect to the "Ctxt" node. Now we search the modified query over this X-DAG (starting at the Root) to obtain the correct solution with respect to the relative XPath expression. By modifying the X-DAG of FIG. 5 we ensure that the document will be traversed exactly once to evaluate a relative XPath expression, thus avoiding the problem of multiple traversals faced by current XPath processors.

We now present an optimization to the above method that can be applied if the XML document is in memory or if the mechanism by which the XML document is traversed can be modified. The basic idea is to reorder the input document 107 so that only portions of the document 107 that have a high probability of yielding useful results are visited first (in left to right order of traversal). Other parts of the document are visited only if necessary, for example, if only one constraint in the set of constraints is found in the first portion visited.

Figure 7:
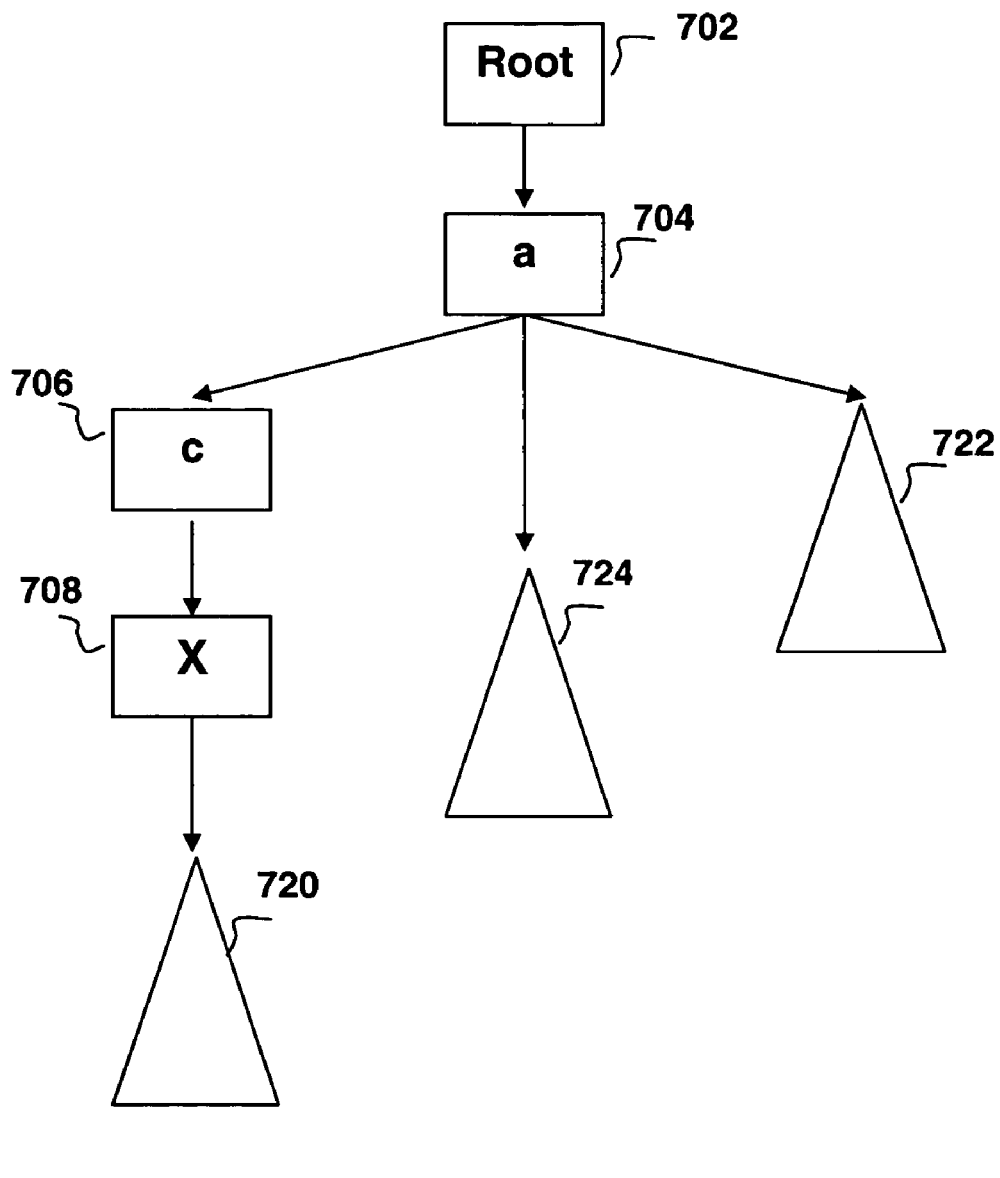
FIG. 7 is a block diagram representation of the reordered tree structure of the XML document of FIG. 2, according to an embodiment of the invention.

For example, consider the XPath expression of FIG. 3. Without reordering, the algorithm would traverse the entire document and return all "b" elements that satisfy the constraints of the XPath expression. FIG. 7 shows a representation of a reordered tree structure showing the context element "X" along the left-most path of the tree. Since the tree structure is traversed in left to right order, placing the element corresponding to the context node in the left-most portion of the tree will ensure that a minimum of elements are traversed. The method would begin the search at Root 702, and then proceed to the "a" element 704. Following a left to right order, the "c" element 706 would be searched next, and then the subtree 720 would be traversed. If the subtree 720 contains a "d" element, then the subtrees 724 and 722 will never be searched. This is because if the subtree contains a "b" element, then all the search criteria of the XPath expression will be satisfied and the "b" element can be emitted. If the subtree 720 does not contain a "b" element, then since there is only one element (the one marked "X") that can satisfy the context node criteria of the X-DAG, one can infer that the criteria will not be satisfied by the document. Since the criteria specify that any "b" element must be a descendant of the context node, any "b" node found must be in subtree 720. Therefore, only if the subtree 720 contains a "b" node, but no "d" node will the subtrees 724 and 720 be searched for the existence of a "d" node.

Figure 8:
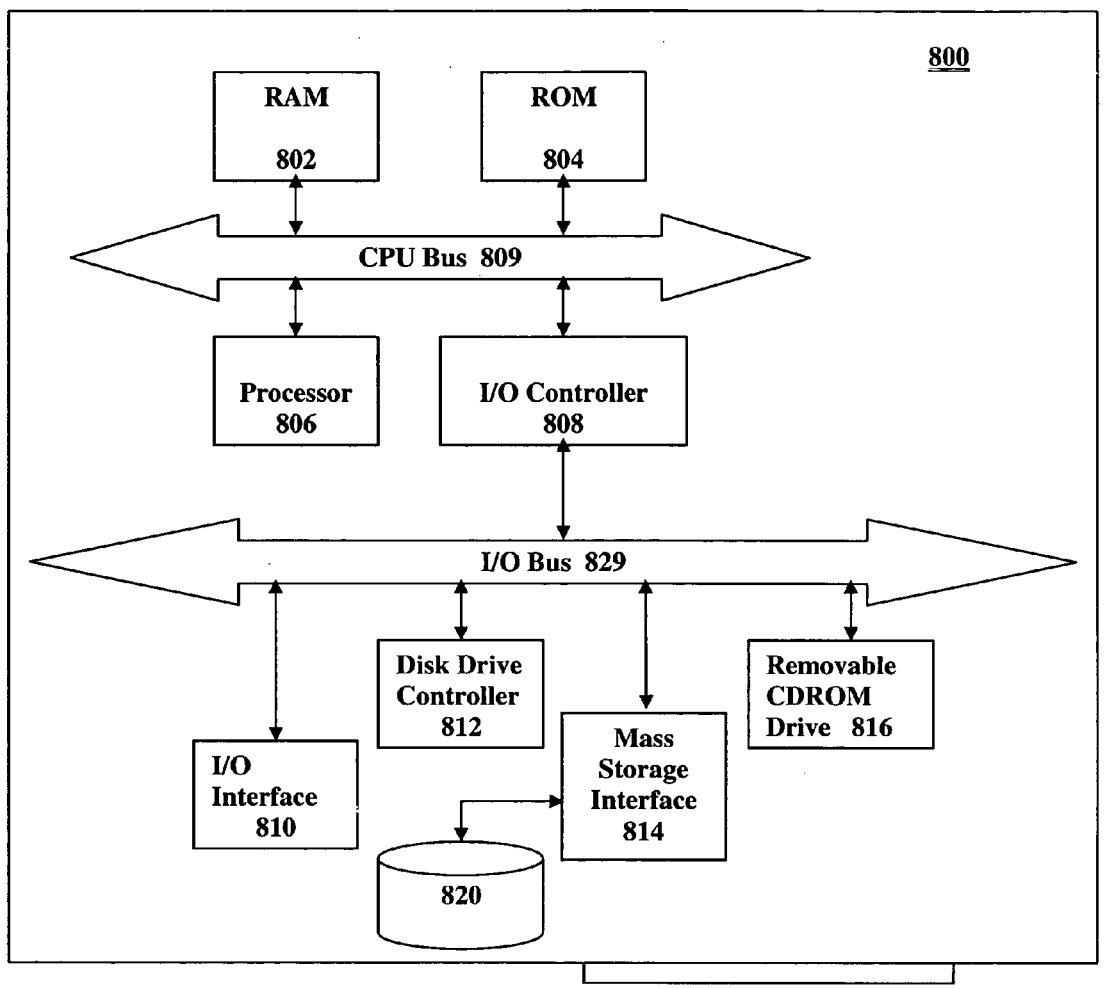
FIG. 8 shows a high level block diagram of an information processing system for performing a method according to an embodiment of the invention.
Figure 8:
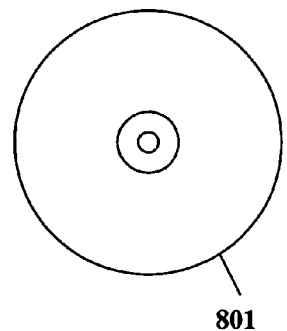

Referring to FIG. 8, there is shown a block diagram of an information handling system 800 according to an embodiment of the invention. According to an embodiment of the invention, a computer readable medium, such as a CDROM 801 can include program instructions for operating the programmable computer 800 according to the invention. The processing apparatus of the programmable computer 800 comprises: random access memory 802, read-only memory 804, a processor 806 and input/output controller 808. These are linked by a CPU bus 809. Additionally, there is an input/output bus 829, and input/output interface 810, a disk drive controller 812, a mass storage device 820, a mass storage interface 814, and a removable CDROM drive 816. What has been shown and discussed is a highly-simplified depiction of a programmable computer apparatus. Those skilled in the art will appreciate that other low-level components and connections are required in any practical application of a computer apparatus.

Therefore, while there has been described what is presently considered to be the preferred embodiment, it will understood by those skilled in the art that other modifications can be made within the spirit of the invention.

I claim:

1. A method for processing an XML document, wherein said XML document comprises a tree structure comprising branches comprising a plurality of nodes, the method comprising steps of:

receiving a query comprising a relative XPath expression relative to a context node, the query comprising search criteria and wherein the search criteria comprise a set of constraints that specify forward and backward relations between nodes;

receiving at least a portion of the XML document;

receiving the context node from the XML document with respect to which the search criteria are applied;

evaluating the relative XPath expression relative to the context node by producing a modified X-DAG of the at least a portion of the XML document, wherein the modified X-DAG is a graph representation of the at least a portion of the XML document generated from the XPath expression, representing the XPath expression and its constraints; and wherein the modified X-DAG comprises a "ctxt" node that only matches the context node; and wherein the modified X-DAG converts backward constraints into forward constraints;

modifying the search criteria in the query to introduce constraints relative to the "ctxt" node into the set of constraints;

searching the modified query over the modified X-DAG, beginning at a root node, processing the modified X-DAG in a streaming manner in a single depth-first traversal of the modified X-DAG; and locating one or more nodes that satisfy the modified search criteria.

2. The method of claim 1, wherein the XML document is stored in memory.

3. The method of claim 1, wherein the XML document is a streaming document.

4. The method of claim 1 further comprising reordering the tree structure representing the XML document to be searched such that the number of nodes traversed is minimized.

5. The method of claim 1 further comprising reordering the tree structure representing the XML document to be searched such that the context node is traversed as early as possible.

6. The method of claim 1 further comprising reordering the tree structure representing the XML document to be searched such that the context node appears in the path of the tree that is traversed first.

7. An information processing system comprising memory for storing the following instructions:

receiving a query comprising a relative XPath expression relative to a context node, the query comprising search criteria and wherein the search criteria comprise a set of constraints that specify forward and backward relations between nodes;

receiving at least a portion of said XML document;

receiving the context node of the XML document with respect to which the search criteria are applied;

evaluating the relative XPath expression relative to the context node by producing a modified X-DAG of the at least a portion of the XML document, wherein the modified X-DAG is a graph representation of the at least a portion of the XML document generated from the XPath expression, representing the XPath expression and its constraints; and wherein the modified X-DAG comprises a "ctxt" node that only matches the context node; and wherein the modified X-DAG converts backward constraints into forward constraints;

modifying the search criteria in the query to introduce constraints relative to the "ctxt" node into the set of constraints;

searching the modified query over the modified X-DAG, beginning at a root node, processing the modified X-DAG in a streaming manner in a single depth-first traversal of the modified X-DAG; and locating one or more nodes that satisfy the modified search criteria; and memory for storing the above instructions; and a processor for performing the instructions.

8. The information processing system of claim 7 wherein the XML document is stored in memory.

9. The information processing system of claim 7 wherein the XML document is a streaming document.

10. The information processing system of claim 7 wherein the memory further comprises logic for modifying the search criteria such that constraints specifying a backward relation may be reformulated into forward constraints.

11. The information processing system of claim 7 further comprising logic for reordering the tree structure representing the XML document to be searched such that the number of nodes traversed is minimized.

12. The information processing system of claim 7 further comprising logic for reordering the tree structure representing the XML document to be searched such that the context node is traversed as early as possible.

* * * * *